US012638098B2

(12) United States Patent　　　　(10) Patent No.:　US 12,638,098 B2
Krishnamurthy　　　　　　　　　　 (45) Date of Patent:　　May 26, 2026

(54) PROPORTIONAL FLUID FLOW VALVE AND METHODS OF OPERATING THEREOF

(71) Applicant: Applied Materials, Inc., Santa Clara, CA (US)

(72) Inventor: Srikanth Krishnamurthy, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 230 days.

(21) Appl. No.: 18/372,526

(22) Filed: Sep. 25, 2023

(65) Prior Publication Data

US 2025/0102074 A1　　Mar. 27, 2025

(51) Int. Cl.
　　*F16K 31/40*　　　(2006.01)
　　*F16K 7/16*　　　　(2006.01)
　　*F16K 31/00*　　　(2006.01)
　　*F16K 31/122*　　 (2006.01)
　　*F16K 37/00*　　　(2006.01)
(52) U.S. Cl.
　　CPC .............. *F16K 31/402* (2013.01); *F16K 7/16* (2013.01); *F16K 31/007* (2013.01); *F16K 31/122* (2013.01); *F16K 37/00* (2013.01)
(58) Field of Classification Search
　　CPC .... F16K 31/402; F16K 31/007; F16K 31/122; F16K 7/16; F16K 37/00
　　USPC ............. 137/14, 487.5, 315.05, 510, 512.15, 137/516.11, 516.29, 625.4, 599.03, 602, 137/614.13; 251/331, 129.17, 335.2; 604/67, 131
　　See application file for complete search history.

(56) References Cited

U.S. PATENT DOCUMENTS

| 4,696,195 | A | * | 9/1987 | Savonlahti | ............ | F16K 11/022 |
| | | | | | | 73/864.84 |
| 5,281,885 | A | * | 1/1994 | Watanabe | ............. | F16K 31/007 |
| | | | | | | 251/129.01 |
| 5,983,941 | A | * | 11/1999 | Fritz | ................... | F16K 31/0682 |
| | | | | | | 137/625.65 |
| 6,019,346 | A | * | 2/2000 | Miller | ..................... | F16K 31/02 |
| | | | | | | 251/129.08 |
| 6,318,408 | B1 | * | 11/2001 | Fukano | ............... | F16K 11/0525 |
| | | | | | | 137/625.65 |
| 9,458,943 | B2 | * | 10/2016 | Eurich | ................ | F16K 31/1225 |
| 10,221,957 | B2 | * | 3/2019 | Ohta | ........................ | F16K 11/04 |
| 10,330,212 | B2 | * | 6/2019 | Chase | ................... | F16K 31/007 |

(Continued)

OTHER PUBLICATIONS

International Search Report and Written Opinion for International Application No. PCT/US2024/011277, mailed Jun. 24, 2024, 10 Pages.

*Primary Examiner* — Minh Q Le
(74) *Attorney, Agent, or Firm* — Lowenstein Sandler LLP

(57)　　　　　　　ABSTRACT

Certain embodiments of the present disclosure relate to a fluid flow valve. The valve includes a housing configured to receive a flow of fluid. The valve further includes a diaphragm to actuate between a closed position and a plurality of open positions. The valve further includes a first valve portion configured to flow a first amount of fluid responsive to the diaphragm actuating to one or more first open positions of the plurality of open positions. The valve further includes a second valve portion in parallel with the first valve portion and configured to flow a second amount of fluid responsive to the diaphragm actuating to one or more second open positions of the plurality of open positions.

20 Claims, 10 Drawing Sheets

(56) References Cited

U.S. PATENT DOCUMENTS

| | | | |
|---|---|---|---|
| 11,067,187 B2 * | 7/2021 | Hagstrom | F16K 31/007 |
| 2006/0185419 A1 * | 8/2006 | Gamache | F16K 7/14 |
| | | | 73/23.41 |
| 2006/0260701 A1 * | 11/2006 | Mattes | F16K 31/402 |
| | | | 137/803 |
| 2007/0131615 A1 | 6/2007 | Moran et al. | |
| 2012/0316492 A1 | 12/2012 | Chappel | |
| 2014/0203198 A1 * | 7/2014 | Jennings | G05D 16/0655 |
| | | | 251/61.1 |
| 2016/0341330 A1 | 11/2016 | Sneh | |
| 2019/0101179 A1 | 4/2019 | Schmidt et al. | |
| 2020/0278234 A1 * | 9/2020 | Kondo | G05D 7/0635 |
| 2022/0196163 A1 | 6/2022 | Tsuchiguchi et al. | |
| 2022/0276664 A1 * | 9/2022 | Price | G05D 7/0647 |
| 2025/0067347 A1 * | 2/2025 | Shakudo | F16K 1/42 |

* cited by examiner

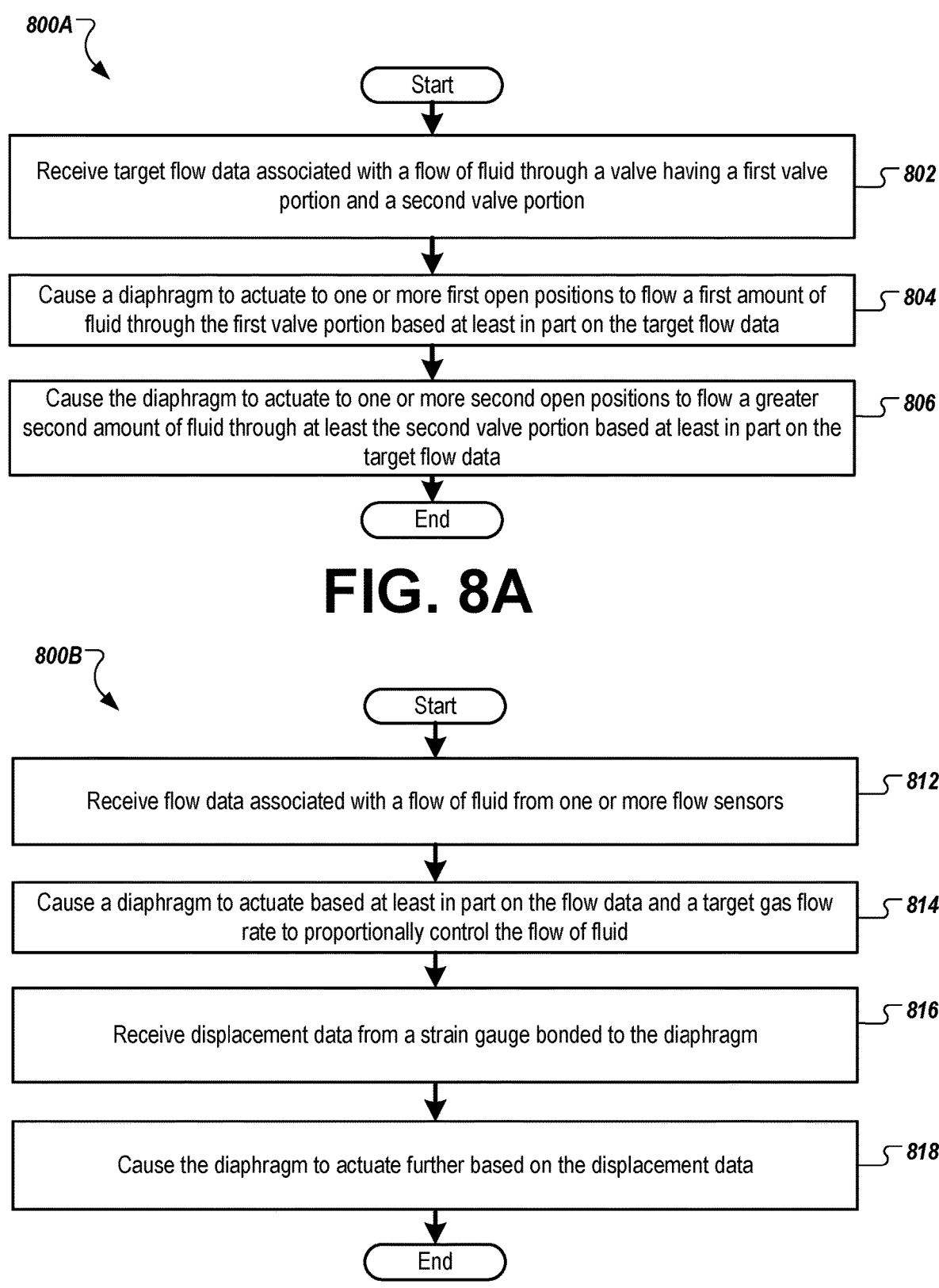

*800A*

Start

Receive target flow data associated with a flow of fluid through a valve having a first valve portion and a second valve portion — 802

Cause a diaphragm to actuate to one or more first open positions to flow a first amount of fluid through the first valve portion based at least in part on the target flow data — 804

Cause the diaphragm to actuate to one or more second open positions to flow a greater second amount of fluid through at least the second valve portion based at least in part on the target flow data — 806

End

Start

Receive flow data associated with a flow of fluid from one or more flow sensors — 812

Cause a diaphragm to actuate based at least in part on the flow data and a target gas flow rate to proportionally control the flow of fluid — 814

Receive displacement data from a strain gauge bonded to the diaphragm — 816

Cause the diaphragm to actuate further based on the displacement data — 818

End

FIG. 8B

PROPORTIONAL FLUID FLOW VALVE AND METHODS OF OPERATING THEREOF

TECHNICAL FIELD

Embodiments of the present disclosure relate, in general, to a proportional valve for controlling a flow of fluid.

BACKGROUND

Various manufacturing systems (e.g., for semiconductor applications) may include fluid control valves control the amount of fluid flowed e.g., to a process chamber. In some manufacturing systems, process gases (e.g., gases used during semiconductor fabrication processes) and/or cleaning gases (e.g., gases used to clean a manufactured device and/or a chamber used in manufacturing an electronic device) may have precise delivery targets including high mass flow rates as well as the ability to precisely control low flow rates.

SUMMARY

Certain embodiments of the present disclosure relate to a fluid flow valve including a housing configured to receive a flow of fluid. The valve further includes a diaphragm configured to actuate between a closed position and a plurality of open positions. The valve further includes a first valve portion configured to flow a first amount of fluid responsive to the diaphragm actuating to one or more first open positions of the plurality of open positions. The valve further includes a second valve portion in parallel with the first valve portion and configured to flow a second amount of fluid responsive to the diaphragm actuating to one or more second open positions of the plurality of open positions.

In another aspect of the disclosure, a fluid flow system includes a valve and a processing device. The valve includes a housing configured to receive a flow of fluid. The valve further includes a diaphragm configured to actuate between a closed position and a plurality of open positions. The valve further includes a first valve portion and a second valve portion in parallel with the first valve portion. The processing device is configured to cause the first valve portion to flow a first amount of fluid by causing the diaphragm to actuate to one or more first open positions of the plurality of open positions. The processing device is further configured to cause the second valve portion to flow a second amount of fluid by causing the diaphragm to actuate to one or more second open positions of the plurality of open positions.

In another aspect of the disclosure, a method includes receiving target flow data associated with a flow of fluid through a valve having a first valve portion and a second valve portion in parallel with the first valve portion. The method further includes causing a diaphragm to actuate to one or more first open positions to flow a first amount of fluid through the first valve portion based at least in part on the target flow data. The method further includes causing the diaphragm to actuate to one or more second open positions to flow a greater second amount of fluid through at least the second valve portion based at least in part on the target flow data.

BRIEF DESCRIPTION OF DRAWINGS

The present disclosure is illustrated by way of example, and not by way of limitation, in the figures of the accompanying drawings in which like references indicate similar elements. It should be noted that different references to "an"

or "one" embodiment in this disclosure are not necessarily to the same embodiment, and such references mean at least one.

FIGS. 8A-8B are flow diagrams of methods of controlling a fluid flow valve in accordance with embodiments of the present disclosure.

DETAILED DESCRIPTION OF EMBODIMENTS

Figure 1:
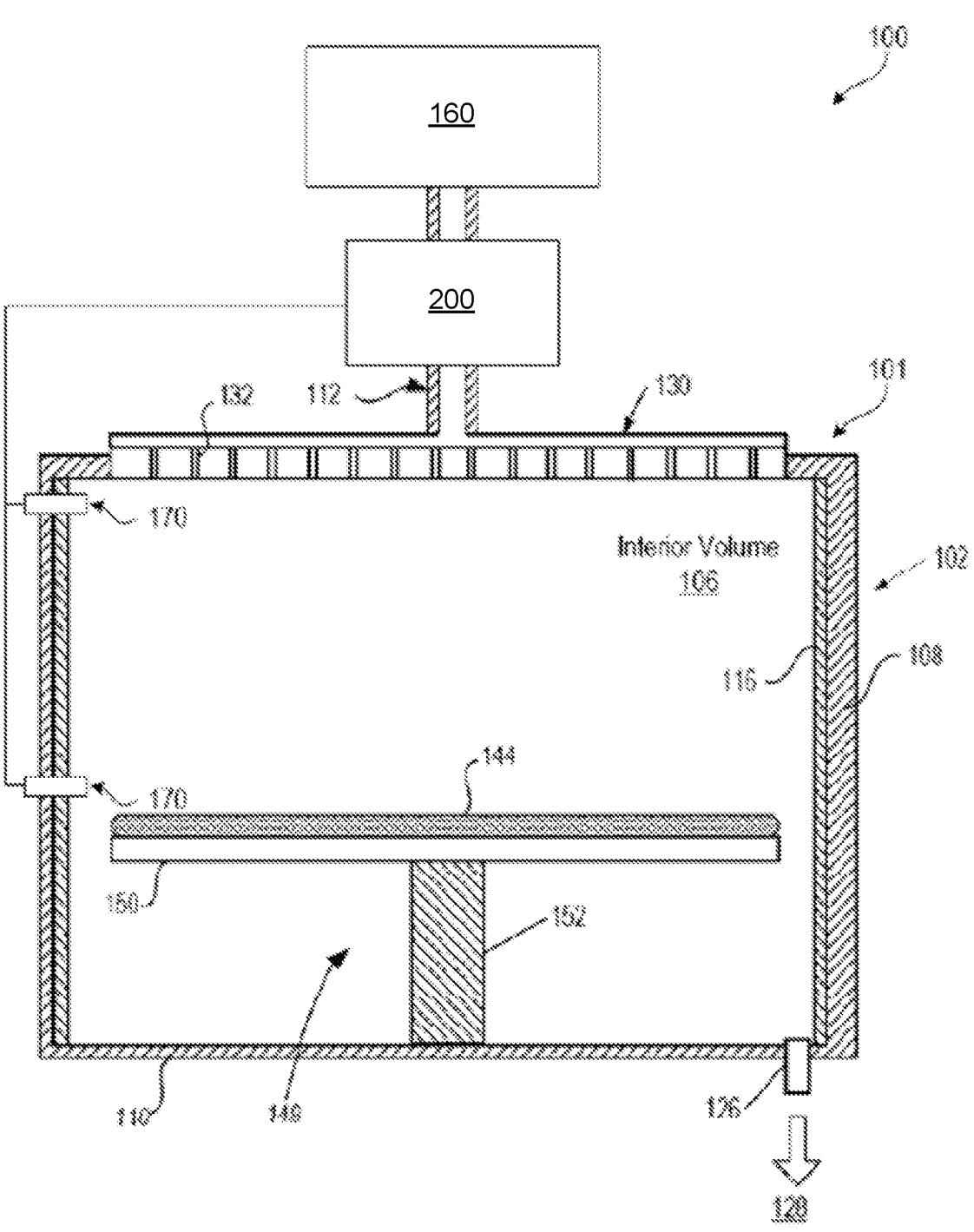
FIG. 1 illustrates an exemplary system that includes a processing chamber, a gas source, and a flow control apparatus, in accordance with embodiments of the present disclosure.

Embodiments described herein relate to a fluid flow valve (e.g., a gas flow valve), a fluid flow system incorporating the same, and a method of controlling the fluid flow valve. Generally, it is advantageous to proportionally control the flow of gas to a system such as a substrate manufacturing system. Conventional gas distribution systems (e.g., fluid distribution systems) use mass flow controllers (MFCs) to regulate the flow of gas to a target flow rate. MFCs are typically complicated and add significant cost to the system along with increased maintenance. Additionally, MFCs typically suffer from slow response times which can adversely affect substrate processing. For example, MFCs can often have a response time greater than 700 milliseconds. The long response times of typical MFCs are not suitable for short duration process recipe operations which use quick adjustments of gas flow. Further, MFCs often include moving parts in the wetted flow path. Movement of these parts in the wetted flow path can lead to the generation of particles that can be carried into a process chamber and adversely affect the substrate process and/or become deposited on a processed substrate, leading to imperfections and/or scrapping of the processed substrate. Moreover, MFCs often have a limited flow range along with poor control at low flow rates.

Aspects and implementations of the instant disclosure address the above-described and/or other shortcomings of conventional fluid flow valves and systems by providing a fluid flow valve having two parallel valve portions to proportionally control the flow of fluid through the valve. In some embodiments, the fluid valve described herein is able to control a flow of fluid (e.g., for semiconductor processing) at very high response times (e.g., less than 20 milliseconds) using a fast actuator such as a piezo-based actuator (e.g., a piezoelectric-based actuator) or a solenoid-based actuator.

The fluid valve described herein may have the capability to control a wide flow range with fine control throughout the flow range. In some embodiments, the fluid flow valve described herein includes direct feedback on a diaphragm displacement (e.g., via a strain gauge bonded to the diaphragm) to ensure accurate, repeatable, and/or reproducible fluid flow delivery.

In some embodiments, a fluid flow valve includes a housing to receive a flow of fluid (e.g., a flow of gas from a gas source, etc.). The housing may have one or more internal passages to flow the fluid along one or more fluid flow paths within the housing. The fluid may be a process gas such as nitrogen, argon, etc. The fluid may be a corrosive gas, for example, a gas used in substrate etching operations, etc. In some embodiments, the housing includes a base portion that is to couple to a fluid flow assembly (e.g., a gas flow assembly, a gas stick assembly, etc.).

In some embodiments, a fluid flow valve includes a first valve portion and a second valve portion in parallel with the first valve portion. The first and second valve portions may be opened or closed by the actuation of a diaphragm. In some embodiments, a diaphragm disposed within the housing can be actuated between a closed position and multiple open positions. In some embodiments, a first portion of the diaphragm's range of movement actuates the first valve portion and not the second valve portion, while a second portion of the diaphragm's range of movement actuates both the first valve portion and the second valve portion. In some embodiments, the diaphragm can be actuated to open the first valve portion without opening the second valve portion. In some embodiments, after the diaphragm is actuated beyond a threshold position, the second valve portion opens.

In some embodiments, the first valve portion is configured to flow a first amount of fluid responsive to the diaphragm actuating to an open position up to the threshold position. In some embodiments, the second valve portion is configured to flow a second amount of fluid responsive to the diaphragm actuating to an open position beyond the threshold position. In some embodiments, fluid flow through the second valve portion is to combine with fluid flow through the first valve portion. In some embodiments, the first valve portion and the second valve portion are enabled by a dual poppet valve design. An inner poppet (e.g., an inner poppet valve, etc.) corresponding to the first valve portion may be opened by the diaphragm in the first part of the diaphragm's range of motion, and one or more outer poppets (e.g., one or more outer poppet valves, etc.) corresponding to the second valve portion may be opened by the diaphragm in the second part of the diaphragm's range of motion. In some embodiments, a poppet (e.g., a poppet valve) includes a plug that seals against a sealing surface forming a hole. Fluid is allowed to flow past the plug when the plug is unseated from the sealing surface. In some embodiments, the flow of fluid through the first valve portion is relatively small compared to the flow of fluid through the second valve portion. This way, a "soft start" of fluid flow and/or precise metering of small fluid flows can be accomplished. By combining a large flow of fluid through the second valve portion with the relatively smaller flow of fluid through the first valve portion, fine control of the overall combined fluid flow can be accomplished over a wide range of flowrates.

In some embodiments, the diaphragm is actuated by a fast actuator such as a piezoelectric-based actuator or a solenoid-based actuator. In some embodiments, the fluid flow valve has a response time less than 20 milliseconds. The diaphragm may be actuated by a stacked piezoelectric actuator, a voice coil actuator, or a bending piezoelectric actuator. In some embodiments, a strain gauge is coupled to the diaphragm so that feedback loop control can be established. For example, a controller can control the actuator to actuate the diaphragm based on the position of the diaphragm sensed by the strain gauge. In some embodiments, the fluid flow valve is controlled (e.g., by the controller) based on target flowrate data and/or target pressure data, sensed flowrate data, sensed pressure data, and/or position data associated with the first and/or second valve portions.

Embodiments of the present disclosure provide advantages over conventional systems, valves, and MFCs described above. Particularly, some embodiments described herein provide a fluid flow valve that can control the flowrate of a fluid with fine control over a wide range of flowrates. This is accomplished by including the first valve portion to flow a small amount of fluid and the second valve portion to flow a relatively larger amount of fluid. Further, the fluid valve described herein provides mass flow control of a fluid and can also provide pressure control of the fluid. Moreover, the fluid valve described herein provides a quicker response time than conventional MFCs for adjusting fluid flowrates, allowing for more precise and quicker control for process operations. Additionally, a strain gauge-based position feedback enables improved flow control accuracy. Furthermore, the fluid valve described herein includes no moving parts in the wetted flow path, leading to reduced particle generation which can improve substrate processing system throughput.

FIG. 1 depicts a system 100 that includes a processing chamber 101, a gas source 160, and a flow control apparatus (e.g., gas stick assembly 200) in accordance with embodiments of the present disclosure. The processing chamber 101 may be used for processes in which a corrosive plasma environment is provided. For example, the processing chamber 101 may be a chamber for a plasma etcher or plasma etch reactor, a plasma cleaner, and so forth. In alternative embodiments, other processing chambers may be used, which may or may not be exposed to a corrosive plasma environment. Some examples of chamber components include a chemical vapor deposition (CVD) chamber, a physical vapor deposition (PVD) chamber, an ALD chamber, an IAD chamber, an etch chamber, and other types of processing chambers. In some embodiments, processing chamber 101 may be any chamber used in an electronic device manufacturing system.

In one embodiment, the processing chamber 101 includes a chamber body 102 and a showerhead 130 that encloses an interior volume 106. The showerhead 130 may include a showerhead base and a showerhead gas distribution plate (GDP), which may have multiple gas delivery holes 132 (also referred to herein as channels) throughout the GDP. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel, or other suitable material such as titanium. The chamber body 102 generally includes sidewalls 108 and a bottom 110.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 101.

The gas source 160 may be coupled to the processing chamber 101 to provide process and/or cleaning gases via supply line 112 to the interior volume 106 through a showerhead 130. The flow control apparatus (e.g., gas stick 200) may be coupled to the gas source 160 and processing chamber 101. The flow control apparatus may be used to measure and control the flow of gas from the gas source 160 to interior volume 106. An exemplary flow control apparatus is described in greater detail below with respect to FIGS. 2A-2B. In some embodiments, a flow control apparatus includes a gas flow valve having a first valve portion and a second valve portion as described herein. In some embodiments, one or more gas panels 160 may be coupled to processing chamber 101 to provide gases to the interior volume 106. In such embodiments, one or more flow control systems may be coupled to each gas source 160 and processing chamber 101. In other embodiments, a single flow control apparatus may be coupled to one or more gas panels 160. In some embodiments, the flow control apparatus may comprise a flow ratio controller to control the flow of gases to the processing chamber 101 (e.g., through one or more supply lines 112), or to other processing chambers.

In some embodiments, a separate flow control apparatus is used for each gas supplied to the processing chamber. In embodiments, each flow control apparatus is or includes a gas stick assembly 200, as described and illustrated below with respect to FIGS. 2A-2B.

The showerhead 130 may be supported on the sidewall 108 of the chamber body 102. The showerhead 130 (or lid) may be opened to allow access to the interior volume 106 of the processing chamber 101, and may provide a seal for the processing chamber 101 while closed. The gas source 160 may be coupled to the processing chamber 101 to provide process and/or cleaning gases to the interior volume 106 through the showerhead 130 or lid and nozzle (e.g., through apertures of the showerhead or lid and nozzle).

In some embodiments, one or more sensor assemblies 170 may be disposed within the interior volume 106. For example, one or more sensor assemblies 170 may be located near (e.g., within 10 centimeters of) the showerhead 130. As another example, one or more sensor devices may be located near (e.g., within 10 centimeters of) the substrate 144, which may be used to monitor conditions near the reaction site.

In one embodiment, the substrate support assembly 148 includes a pedestal 152 that supports an electrostatic chuck 150. The electrostatic chuck 150 further includes a thermally conductive base and an electrostatic puck bonded to the thermally conductive base by a bond, which may be a silicone bond in one embodiment. The thermally conductive base and/or electrostatic puck of the electrostatic chuck 150 may include one or more optional embedded heating elements, embedded thermal isolators, and/or conduits to control a lateral temperature profile of the substrate support assembly 148. The electrostatic puck may further include multiple gas passages such as grooves, mesas, and other surface features that may be formed in an upper surface of the electrostatic puck. The gas passages may be fluidly coupled to a source of a heat transfer (or backside) gas such as helium via holes drilled in the electrostatic puck. In operation, the backside gas may be provided at controlled pressure into the gas passages to enhance the heat transfer between the electrostatic puck and a supported substrate 144. The electrostatic chuck 150 may include at least one clamping electrode controlled by a chucking power source.

Figure 2A:
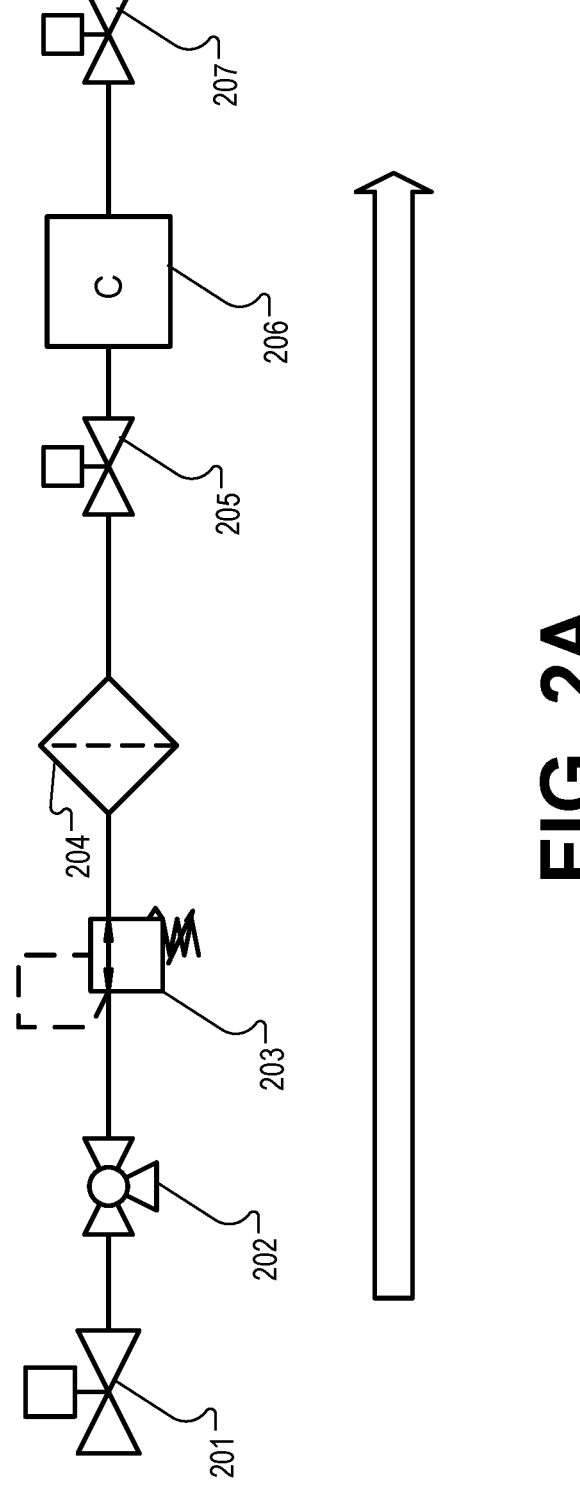
FIG. 2A is a schematic diagram of a gas stick assembly in accordance with embodiments of the present disclosure.

FIG. 2A illustrates a schematic diagram of a gas stick assembly 200 in accordance with embodiments of the present disclosure. A plurality of gas stick assemblies may receive gasses from a plurality of gas supplies. For example, a processing device may include a different gas stick assembly for each type of gas that is delivered into a process chamber. As shown, gas flows from left to right through the gas stick assembly. In some embodiments, gas stick assembly 200 includes a hybrid valve 201, which may be a first component of the gas stick assembly 200. A hybrid valve may include a manual valve and a valve that can be automatically actuated (e.g., a pneumatic valve, electrical valve, etc.). Hybrid valve 201 may receive a gas from a gas source (not illustrated). The hybrid valve 201 may direct the gas to a purge valve 202 via one or more passages. The purge valve 202 may be configured to purge the gas stick assembly 200. In some embodiments, gas stick assembly 200 includes a regulator 203. The regulator 203 may receive the gas from the purge valve 202. The regulator 203 may regulate the flow of the gas through the gas stick assembly 200. In some embodiments, a filter 204 is coupled downstream of the regulator 203, and receives the flow of gas from the regulator 203. In some embodiments, an upstream valve 205 may receive the gas from the regulator 203 and direct the gas flow to a mass flow controller 206. The mass flow controller 206 may control the flow of gas through the gas stick assembly 200. In some embodiments, a downstream valve 207 receives the gas from the mass flow controller or other upstream component. The downstream valve 207 may direct the gas toward a gas destination (e.g., a processing chamber; not illustrated). In some embodiments, one or more of the hybrid valve 201, upstream valve 205, mass flow controller 206, or downstream valve 207 include a first valve portion and a second valve portion as described herein.

Figure 2B:
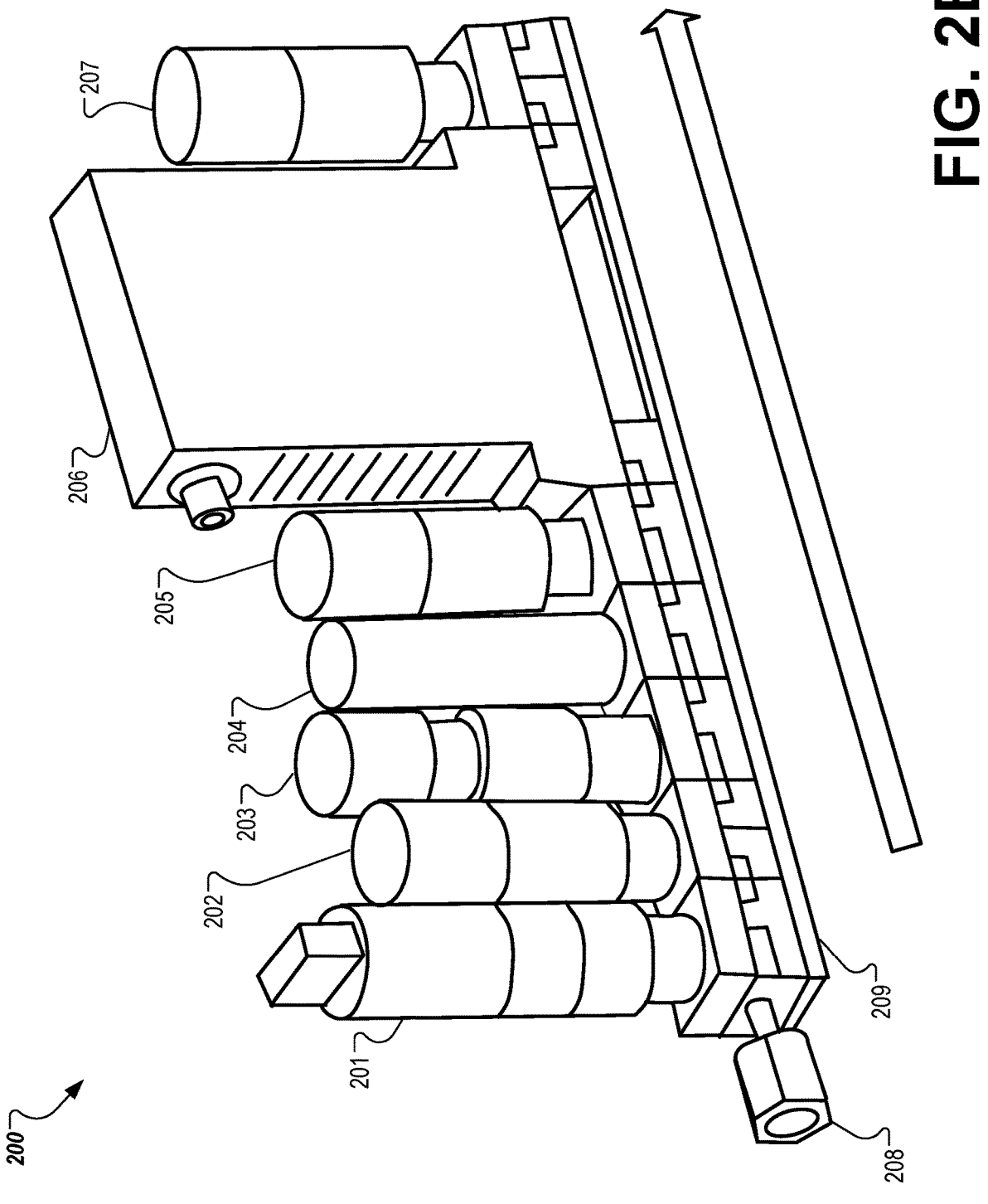
FIG. 2B is a perspective view of a gas stick assembly in accordance with embodiments of the present disclosure.

FIG. 2B illustrates a perspective view of a gas stick assembly 200 in accordance with embodiments of the present disclosure. A plurality of gas stick assemblies may receive gasses from a plurality of gas supplies. For example, a processing device may include a different gas stick assembly for each type of gas that is delivered into a process chamber. As shown, gas flows from left to right through the gas stick assembly.

In some embodiments, gas stick assembly 200 includes a base 209. Gas stick assembly 200 may receive a gas (e.g., from a gas source) via gas coupling 208. In some embodiments, gas stick assembly 200 includes hybrid valve 201, purge valve 202, regulator 203, filter 204, upstream valve 205, mass flow controller 206, and/or downstream valve 207. In some embodiments, each of hybrid valve 201, purge valve 202, regulator 203, filter 204, upstream valve 205, mass flow controller 206, and/or downstream valve 207 are coupled to a gas stick assembly base 209.

Figure 3:
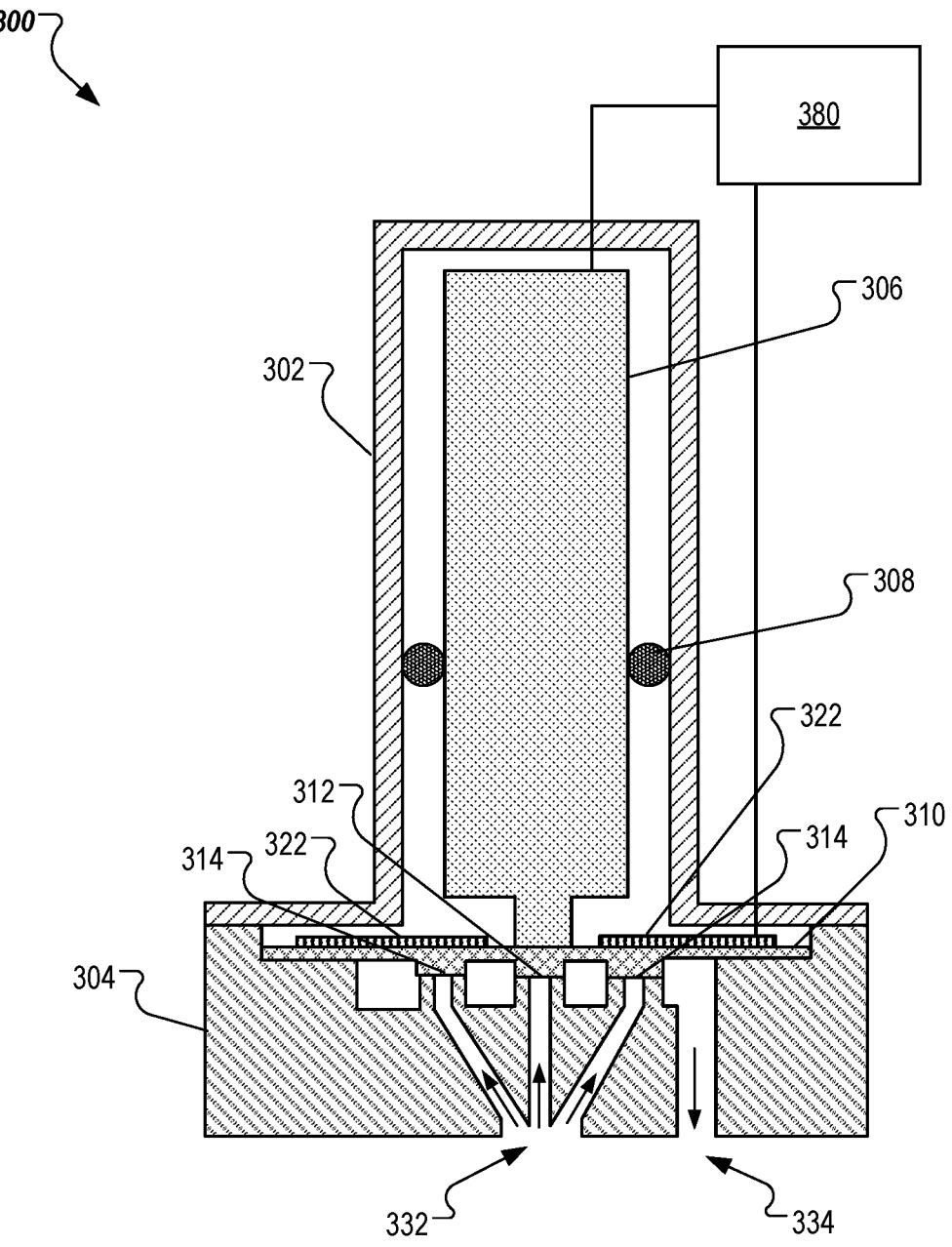
FIG. 3 is a cutaway view of a fluid flow valve in accordance with embodiments of the present disclosure.

FIG. 3 is a cutaway view of a fluid flow valve 300 in accordance with embodiments of the present disclosure. In some embodiments, a fluid (e.g., such as a gas) is introduced at inlet 332. One or more passages within the base 304 guide the fluid to inner poppet 312 and/or outer poppets 314. In some embodiments, inner poppet 312 makes up a first valve portion and outer poppets 314 make up a second valve portion. In some embodiments, outer poppets 314 is an annular poppet that surrounds inner poppet 312. In some embodiments, outer poppets 314 form a radial portion surrounding the inner poppet 312. In some embodiments, diaphragm 310 forms dual poppets. For example, the diaphragm forms the inner poppet 312 and the outer poppets 314. In some embodiments, inner poppet 312 is disposed at a lower height than outer poppets 314 as described in more detail with respect to FIGS. 7A-7C. In some embodiments, the poppet seats (e.g., for inner poppet 312 and/or outer poppets 314) are coated with a polymer to achieve tighter leak rates. In some embodiments, the inner poppet 312 and/or the outer poppets 314 are made of a polymer material. Example polymers may include perfluoroalkoxy alkane (PFA) or polychlorotrifluoroethylene (PCTFE). In some embodiments, diaphragm 310 is coated with a corrosion-resistant coating. In some embodiments, diaphragm 310 is made of a material such as stainless steel or an alloy of nickel (e.g., a corrosion resistant nickel alloy, hastelloy, etc.). In some embodiments, diaphragm 310 may be curved to enhance displacement. In some embodiments, diaphragm 310 may be corrugated.

In some embodiments, an actuator 306 causes diaphragm 310 to move responsive to receiving an input signal from controller 380. For example, controller 380 may send an electrical signal to the actuator 306 to open inner poppet 312 and/or outer poppet 314. The diaphragm 310 may flex and/or un-flex to open or close the poppet(s). The electrical signal from the controller 380 may cause the actuator 306 to move (e.g., flex or un-flex) the diaphragm 310 which causes inner poppet 312 and/or outer poppet 314 to open or close to control flow of fluid. In some embodiments, the actuator 306 causes the diaphragm 310 to flex by pushing or pulling on the diaphragm 310 proximate the center of the diaphragm 310. When at least one of the poppets are open, the fluid may flow through the poppet(s) and out of the housing through fluid outlet 334. In some embodiments, a signal from the controller 380 causes the actuator 306 to proportionally control the flow of fluid through the poppet(s). The controller 380 can send an electrical signal to the actuator 306 to move the diaphragm (e.g., to move the poppet(s)) to control the flow of fluid through the valve. In some embodiments, the actuator 306 preloads the diaphragm 310 so that fluid does not leak.

In some embodiments, the actuator 306 is disposed within a housing 302 that is coupled to the base 304. In some embodiments, the joint between the housing 302 and the base 304 is sealed, such as with a metal seal or a gasket. In some embodiments, the housing 302 is coupled to the base 304 by one or more mechanical fasteners and/or by welding. In some embodiments, a ring 308 in the housing 302 centers the actuator within the housing 302. In some embodiments, the ring 308 is a rubber ring such as an o-ring. In some embodiments, the actuator 306 is selected from a group including an electric solenoid actuator, a voice coil actuator, or a ferrofluidic actuator. In some embodiments, where the flow of fluid is at high temperature, the actuator 306 is a ferrofluidic actuator because of the high temperature toler-ance of ferrofluidic actuators. In some embodiments, a voice coil actuator can provide a constant force on the diaphragm 310 over the full range of motion.

In some embodiments, a strain gauge 322 is coupled to the diaphragm 310. The strain gauge 322 may be attached to the diaphragm 310 by one or more fasteners and/or by a bonding adhesive. Strain gauge 322 may be attached on a top side of diaphragm 310 away from the flow of fluid. In some embodiments, strain gauge 322 is annularly shaped. The strain gauge 322 may surround the center of the diaphragm 310 where the actuator 306 contacts the diaphragm 310. In some embodiments, the strain gauge 322 can sense the flexing of the diaphragm 310 when actuated by actuator 306. Strain gauge 322 may provide direct measurement of the deformation (e.g., flexing or un-flexing) of diaphragm 310. Strain gauge 322 may measure displacement of the dia-phragm. In some embodiments, controller 380 uses displacement data from strain gauge 322 to determine how far the diaphragm 310 has been moved by the actuator 306. In some embodiments, the controller 380 causes actuation of the diaphragm 310 based on displacement data from the strain gauge 322. For example, the controller 380 may output an electrical signal to the actuator 306 to actuate the diaphragm 310 to a first position. The strain gauge 322 may indicate to the controller 380 that the diaphragm 310 has instead been actuated to a different second position. The controller 380 may update the signal to the actuator 306 based on data from the strain gauge 322 to actuate the diaphragm 310 to the first position.

Figures 4A, 4B:
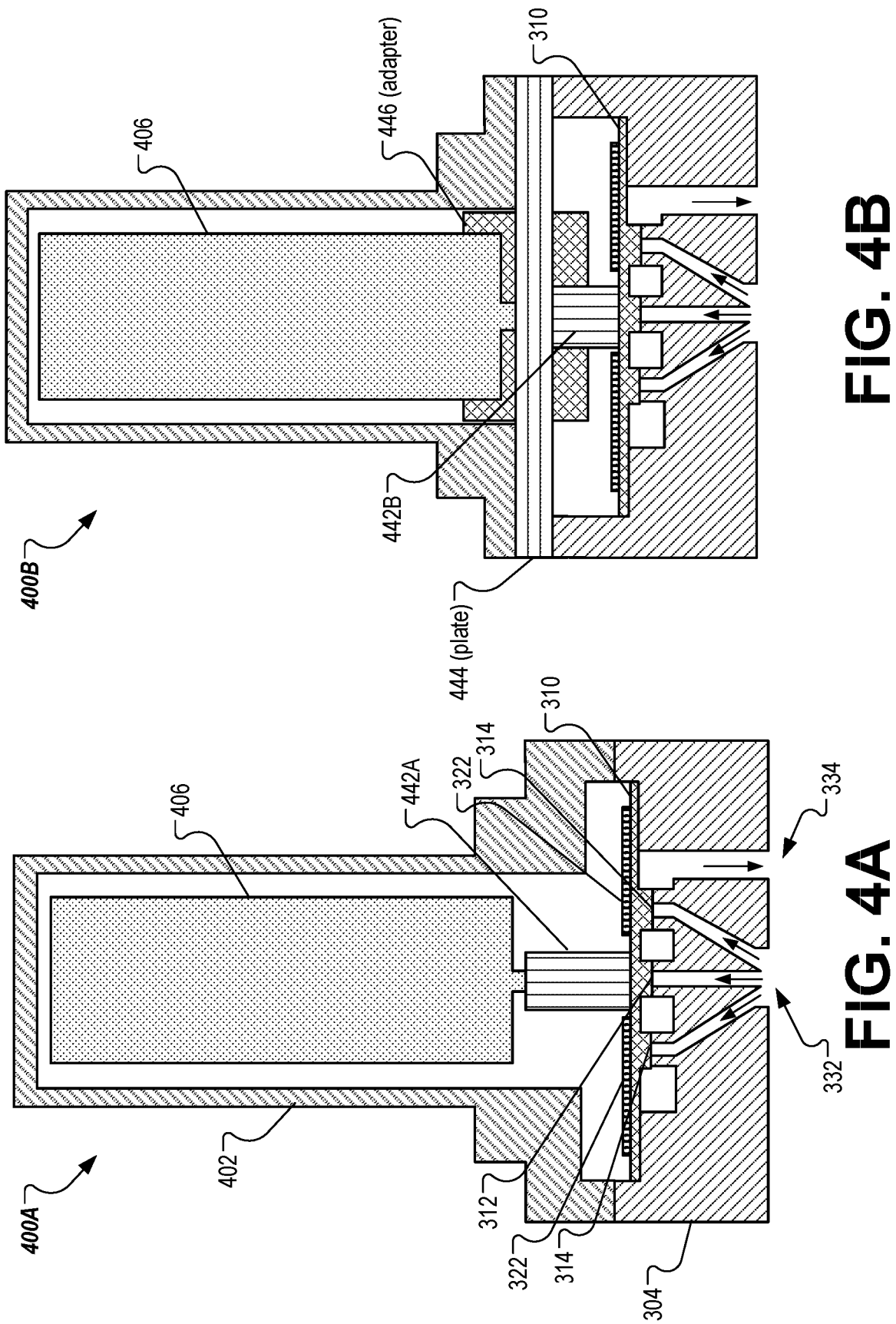
FIGS. 4A-4B are cutaway views of fluid flow valves in accordance with embodiments of the present disclosure.

FIGS. 4A-4B are cutaway views of fluid flow valves in accordance with embodiments of the present disclosure. Referring to FIG. 4A, a side cutaway view of a fluid flow valve 400A in accordance with embodiments of the present disclosure is shown. In some embodiments, diaphragm 310 is actuated by an actuator 406 disposed within a housing 402. In some embodiments, actuator 406 is a piezoelectric-based actuator such as a multi-stack piezoelectric actuator. A multi-stack piezoelectric actuator may include multiple piezoelectric actuators stacked on top of one another. In some embodiments, actuator 406 (e.g., a multi-stack piezo-electric actuator) can apply greater force than actuator 306 (e.g., a solenoid actuator, a voice coil actuator, a ferrofluidic actuator, etc.). Therefore, actuator 406 can be used where fluid inlet pressures are higher than can be used with actuator 306. However, actuator 406 may be capable of a lesser range of travel compared to actuator 306. In some embodiments, actuator 406 has a finer resolution than actuator 306. In some embodiments, actuator 406 presses on a plunger 442A to actuate the diaphragm 310. Actuator 406 may be actuated based on an electrical signal (e.g., from a controller such as controller 380). In some embodiments, actuator 406 can apply just a pushing force (e.g., can push downwards on plunger 442A but not upwards on the plunger 442A). In some embodiments, valve 400A is a normally open valve.

Referring to FIG. 4B, a side cutaway view of a fluid flow valve 400B in accordance with embodiments of the present disclosure is shown. In some embodiments, valve 400B includes a transfer mechanism to convert motion of the actuator 406 in a first direction into motion of the diaphragm in an opposite second direction. In some embodiments, the transfer mechanism converts a 'push' force of actuator 406 into a 'pull' force on diaphragm 310. In some embodiments, a transfer mechanism includes a disc spring (e.g., a fulcrum disc spring) and/or an adapter. In some embodiments, a disc spring includes a conical spring with a fulcrum to convert 'push' force of actuator 406 into a 'pull' force. In some embodiments, actuator 406 is coupled to an adapter 446 which is coupled to plunger 442B. Because actuator 406 may be capable of applying just a pushing force (e.g., can push downwards), actuator 406 is coupled to adapter 446 to cause diaphragm 310 to move upwards (e.g., via plunger 442B). In some embodiments, responsive to an electrical signal (e.g. from a controller such as controller 380), actua-tor 406 actuates to exert a force on plate 444, causing actuator 406 to move upwards, lifting adapter 446 and plunger 442B. The lifting of plunger 442B causes diaphragm 310 to flex so that poppet(s) 312, 314 can open to flow fluid. In some embodiments, actuator 406 allows diaphragm 310 to un-flex (e.g., closing poppet(s) 312, 314, allowing plunger 442B and adapter 446 to move downwards) responsive to receiving the corresponding control signal. In some embodi-ments, valve 400B is a normally closed valve.

Figure 5B:
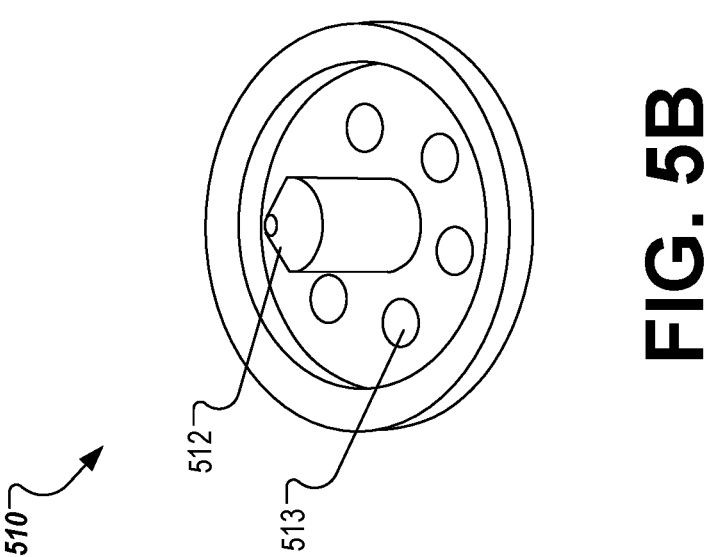
FIG. 5B is a perspective view of a flexure poppet member in accordance with embodiments of the present disclosure.
Figure 5A:
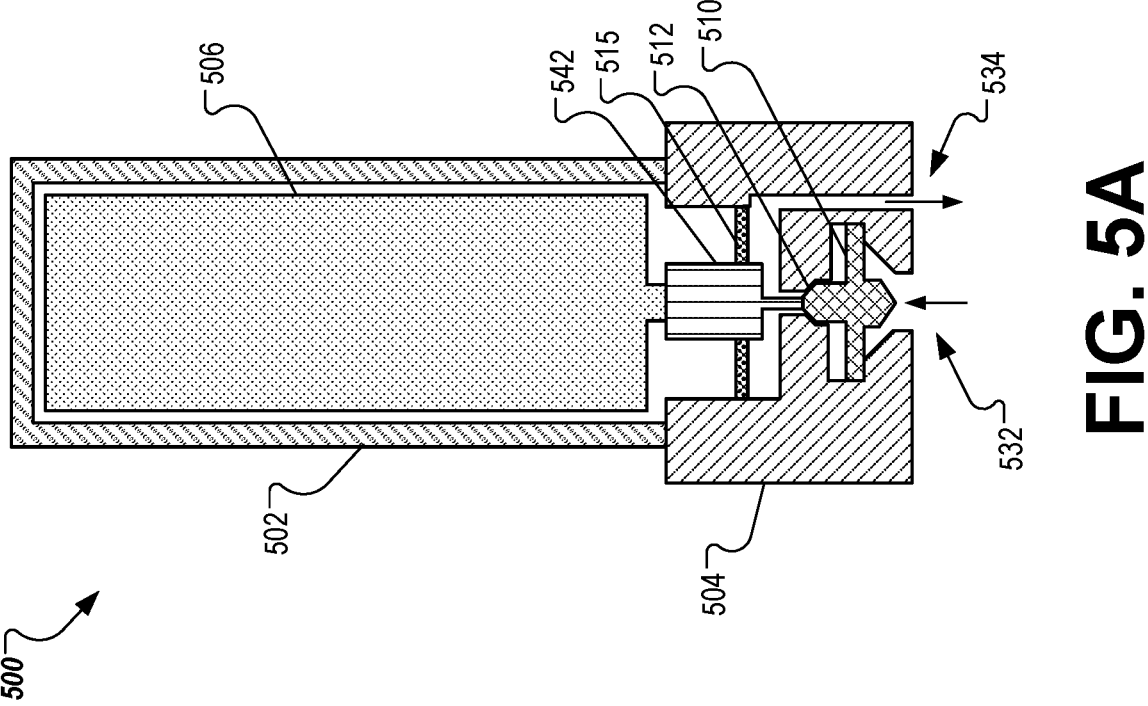
FIG. 5A is a cutaway view of a fluid flow valve in accordance with embodiments of the present disclosure.

FIG. 5A is a cutaway view of a fluid flow valve 500 in accordance with embodiments of the present disclosure.

FIG. 5B is a perspective view of a flexure poppet member 510 in accordance with embodiments of the present disclosure. Referring to FIG. 5A, valve 500 includes an actuator 506 within a housing 502 that is coupled to base 504. In some embodiments, actuator 506 is a multi-stack piezoelectric actuator similar to actuator 406 of FIGS. 4A and 4B. In some embodiments, actuator 506 can apply a pushing (e.g., downwards) force on a plunger 542. The plunger 542 can in turn push downwards (e.g., when pushed on by actuator 506) on the tip 512 of a flexure poppet member 510. In some embodiments, tip 512 forms a seal with an inner surface of base 504 when flexure poppet member 510 is in a natural position (e.g., an un-flexed state) so that fluid cannot pass. In some embodiments, when actuator 506 is caused to push (e.g., downwards) on plunger 542, flexure poppet member 510 is pushed downwards to allow fluid to pass by tip 512. In some embodiments, the outer portion of flexure poppet member 510 flexes when tip 512 is pushed by plunger 542. In some embodiments, fluid is allowed to flow from fluid inlet 532, through multiple holes 513 formed in the outer portion of the flexure poppet member 510, past tip 512, and out of the base 504 through fluid outlet 534. A diaphragm 515 may seal around plunger 542 to isolate the actuator 506 from flowing fluid and to prevent leaks. The outer edge of diaphragm 515 may coupled to the base 504 and the inner edge of diaphragm 515 may be coupled to the plunger 542. The diaphragm 515 may flex with the motion of plunger 542. In some embodiments, an outer rim of flexure poppet member 510 holds the flexure poppet member 510 in place within the base 504 when flexed by the pushing of actuator 506 (e.g., via plunger 542). In some embodiments, flexure poppet member 510 is made of a polymer. In some embodiments, flexure poppet member 510 acts as a spring to keep the poppet normally closed, yet allowing fluid flow when pushed by actuator 506.

Figure 6:
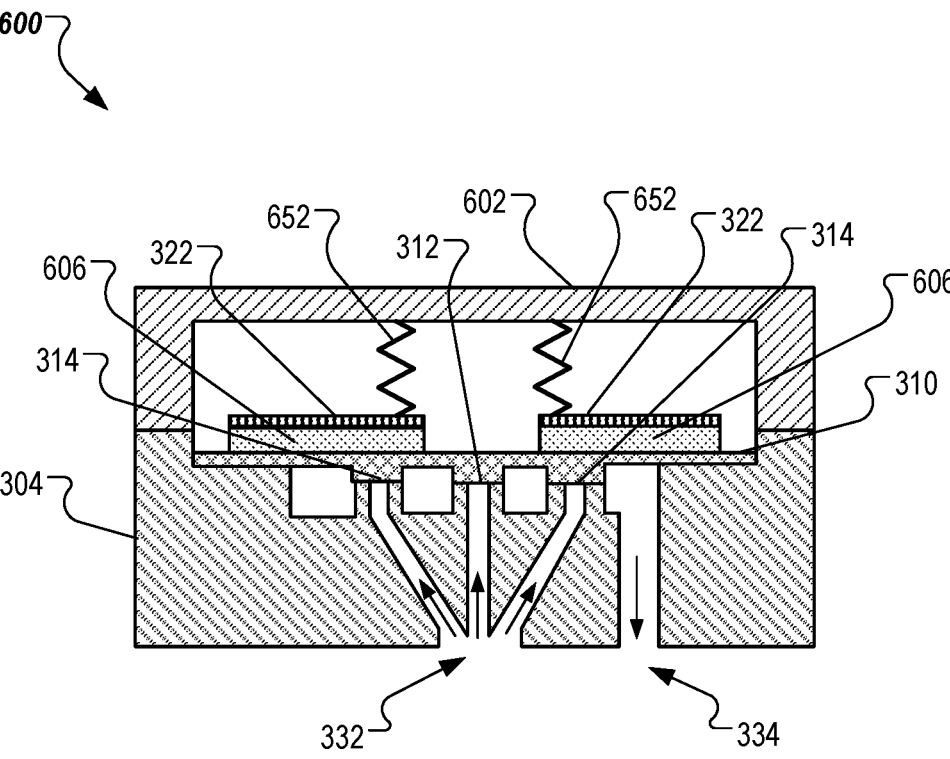
FIG. 6 is a cutaway view of a fluid flow valve in accordance with embodiments of the present disclosure.

FIG. 6 is a cutaway view of a fluid flow valve 600 in accordance with embodiments of the present disclosure. In some embodiments, a bending piezo actuator 606 is coupled to diaphragm 310. Bending piezo actuator 606 may be coupled to a top side of diaphragm 310 away from the flow of fluid. Bending piezo actuator 606 may be coupled to diaphragm 310 by one or more mechanical fasteners and/or by adhesive bonding. Strain gauge 322 may be coupled on top of bending piezo actuator 606. Bending piezo actuator 606 may have a higher displacement than multi-stack piezo electric actuator 406 but may be capable of exerting a lesser force than actuator 406. In some embodiments, bending piezo actuator 606 may bend responsive to receiving a control signal (e.g., an electrical signal from a controller such as controller 380). In some embodiments, bending piezo actuator 606 may be a bimorph actuator. In some embodiments, bending piezo actuator 606 includes multiple bending piezo actuators stacked one on top of the other. In some embodiments, the bending of bending piezo actuator 606 causes diaphragm 310 to flex and/or un-flex so that poppet(s) 312, 314 can be opened and/or closed. In some embodiments, one or more springs 652 within housing 602 pushes on bending piezo actuator 606 to cause diaphragm 310 to move to a closed position (e.g., closing poppet(s) 312, 314) when bending piezo actuator 606 relaxes responsive to receiving a corresponding control signal (e.g., from the controller). In some embodiments, spring(s) 652 are coil springs.

Figure 7A:
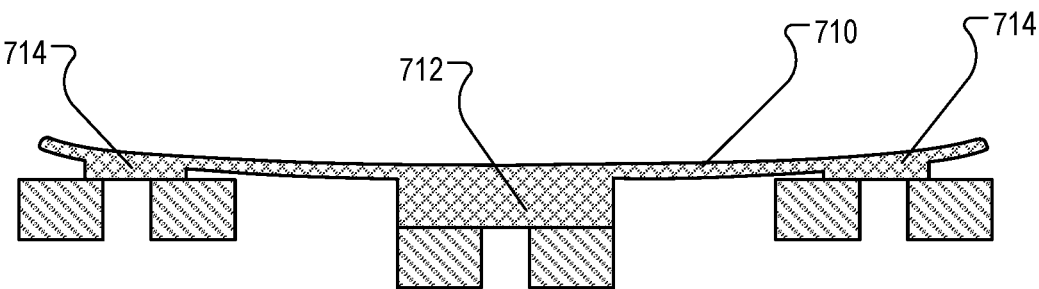
FIGS. 7A-7C are cutaway views of a dual poppet valve diaphragm in accordance with embodiments of the present disclosure.
Figure 7B:
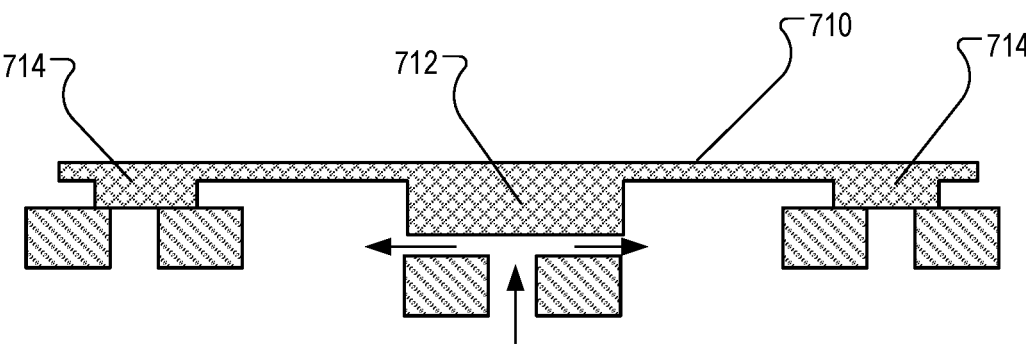
Figure 7C:
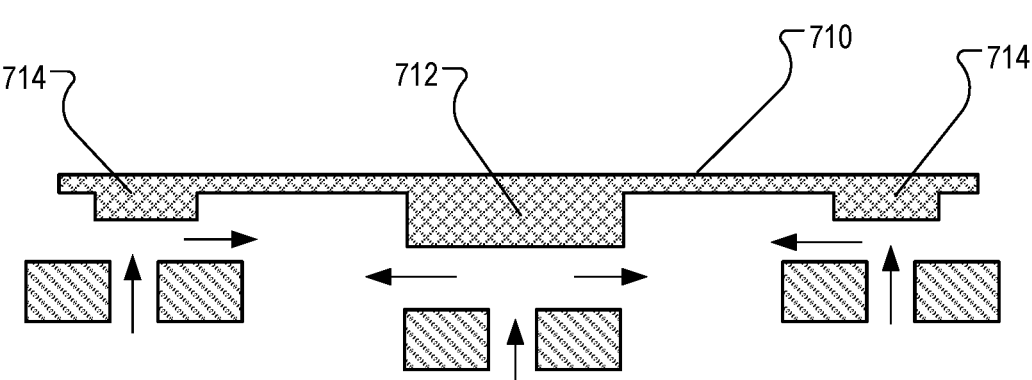

FIGS. 7A-7C are cutaway views of a dual poppet valve diaphragm in accordance with embodiments of the present disclosure. FIG. 7A shows the dual poppet valve diaphragm in a closed position. FIG. 7B shows the dual poppet valve diaphragm in a partially open position. FIG. 7C shows the dual poppet valve diaphragm in a fully open position. Referring to FIG. 7A, inner poppet 712 and outer poppet(s) 714 are shown in a closed position. In some embodiments, when the poppet(s) are closed, no fluid can flow through the poppet(s). In some embodiments, inner poppet 712 and outer poppet(s) 714 form sealing surfaces on a first side (e.g., a bottom side) of diaphragm 710. In some embodiments, inner poppet 712 and outer poppet(s) 714 are made of a polymer. In some embodiments, outer poppet(s) 714 are an annular poppet that surrounds inner poppet 712. In some embodiments, outer poppet(s) 714 are separate poppets disposed proximate the edges of diaphragm 710 while inner poppet 712 is disposed substantially at the center of diaphragm 710. In some embodiments, inner poppet 712 is disposed vertically lower than outer poppet(s) 714.

Referring to FIG. 7B, inner poppet 712 is shown in an open position while outer poppet(s) 714 remain in a closed position. In some embodiments, diaphragm 710 can be actuated to this position (e.g., by an actuator such as actuator 306, 406, 606, etc.) to allow less than a threshold amount of fluid to flow through the inner poppet 712. In some embodiments, diaphragm 710 is actuated to the partially open position (e.g., to open inner poppet 712 while keeping outer poppet(s) 714 closed) to accomplish a "soft start" of the flow of fluid through the valve. Precise metering of small amounts of fluid flow can be accomplished by actuating diaphragm 710 to open and/or close inner poppet 712 while keeping outer poppet(s) 714 closed. Control of inner poppet 712 may control "lift off" of the diaphragm 710 to precisely control small amount of fluid flow.

Referring to FIG. 7C, both inner poppet 712 and outer poppet(s) 714 are shown in an open position. In some embodiments, diaphragm 710 can be actuated to this fully open position to flow more than a threshold amount of fluid. In some embodiments, outer poppet(s) 714 can be opened after inner poppet 712 is fully opened. Thus, the diaphragm 710 having an inner poppet 712 and outer poppet(s) 714 may provide a two-stage poppet design. In some embodiments, outer poppet(s) 714 can flow a substantially greater amount of fluid than inner poppet 712. By controlling the flow of fluid through inner poppet 712 and outer poppet(s) 714, a wide range of fluid flow can be controlled with high precision.

FIGS. 8A-8B are flow diagrams of methods of controlling a fluid flow valve in accordance with embodiments of the present disclosure. FIG. 8A is a flow diagram of a method 800A for controlling a fluid flow valve such as fluid flow valve 300, 400A, 400B, 500, or 600 in accordance with embodiments of the present disclosure. In some embodiments, method 800A is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 800A is performed, at least in part, by a controller a gas flow valve assembly (e.g., controller 380, etc.).

For simplicity of explanation, method 800A is depicted and described as a series of operations. However, operations in accordance with this disclosure can occur in various orders and/or concurrently and with other operations not presented and described herein. Furthermore, in some embodiments, not all illustrated operations are performed to implement method 800A in accordance with the disclosed subject matter. In addition, those skilled in the art will understand and appreciate that method 800A could alternatively be represented as a series of interrelated states via a state diagram or events.

In some embodiments, at block 802, processing logic receives target flow data associated with a flow of fluid through a valve. In some embodiments, the valve has a first valve portion and a second valve portion in parallel with one another within a housing of the valve. The target flow data may correspond to one or more target fluid flow rates (e.g., target gas flow rates) for one or more process recipe operations (e.g., substrate process recipe operations). In some embodiments, the target flow data may indicate that a fluid is to be supplied at a first flowrate for a first duration of time and that the fluid is to be supplied at a different second flowrate for a second duration of time. In some embodiments, the target flow data may indicate that the fluid is to be supplied at a fluctuating flowrate and/or a changing flowrate over time.

In some embodiments, at block 804, processing logic causes a diaphragm to actuate to one or more first open positions to flow a first amount of fluid through the first valve portion. Causing the diaphragm to actuate to the one or more first open positions may include causing the diaphragm to flex and/or move up to a threshold position. Causing the diaphragm to actuate to the one or more first open positions may be based at least in part on the target flow data (e.g., received at block 802). In some embodiments, the diaphragm is caused to actuate (e.g., by an actuator) to open an inner poppet of a dual poppet system to flow the first amount of fluid. In some embodiments, the first amount of fluid is less than a threshold amount of fluid. In some embodiments, the inner poppet is caused to open (e.g., by actuating the diaphragm) to perform a fluid flow "soft start." For example, the flow of fluid is slowly initiated by controlling the rate at which the inner poppet is opened by causing the diaphragm to actuate. One or more outer poppets of the dual poppet system may remain closed when the diaphragm is actuated to the one or more first open positions so that less than the threshold amount of fluid can flow through the valve (e.g., via the open inner poppet).

In some embodiments, at block 806, processing logic causes the diaphragm to actuate to one or more second open positions to flow a greater second amount of fluid through at least the second valve portion. Causing the diaphragm to actuate to the one or more second open positions may include causing the diaphragm to flex and/or move beyond a threshold position. Causing the diaphragm to actuate to the one or more second open positions may be based at least in part on the target flow data (e.g., received at block 802). In some embodiments, the diaphragm is caused to actuate to open one or more outer poppets of a dual poppet system to flow the second amount of fluid. In some embodiments, the second amount of fluid is greater than a threshold amount of fluid. In some embodiments, the one or more outer poppets is caused to open to flow a larger amount of fluid than at block 804. The inner poppet of the dual poppet system may remain open when the diaphragm is actuated to the one or more second open positions. Fluid flow through the inner poppet may be combined with fluid flow through the one or more outer poppets when the diaphragm is opened to the one or more second open positions.

FIG. 8B is a flow diagram of a method 800B for controlling a fluid flow valve such as fluid flow valve 300, 400A, 400B, 500, or 600 in accordance with embodiments of the present disclosure. In some embodiments, method 800B is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 800B is performed, at least in part, by a controller a gas flow valve assembly (e.g., controller 380, etc.).

For simplicity of explanation, method 800B is depicted and described as a series of operations. However, operations in accordance with this disclosure can occur in various orders and/or concurrently and with other operations not presented and described herein. Furthermore, in some embodiments, not all illustrated operations are performed to implement method 800B in accordance with the disclosed subject matter. In addition, those skilled in the art will understand and appreciate that method 800B could alternatively be represented as a series of interrelated states via a state diagram or events.

In some embodiments, at block 812, processing logic receives flow data associated with flow of fluid from one or more flow sensors. In some embodiments, the flow data corresponds to a mass flow rate and/or a volumetric flow rate of a gas flowing in a gas distribution system.

In some embodiments, at block 814, processing logic causes a diaphragm (e.g., of a valve) to actuate based at least in part on the flow data (e.g., received at block 812) and a target fluid flow rate. In some embodiments, the target fluid flow rate is associated with one or more process recipe operations. In some embodiments, the diaphragm is caused to actuated so that the measured fluid flow rate (e.g., measured by the one or more flow sensors) substantially matches the target fluid flow rate. In some embodiments, actuating the diaphragm causes dual poppets to open and/or close to control the fluid flow rate.

In some embodiments, at block 816, processing logic receives displacement data from a strain gauge bonded to the diaphragm. In some embodiments, the strain gauge measures deflection of the diaphragm. A processing device (e.g., of a controller) can determine the position of the diaphragm based on the data from the strain gauge.

In some embodiments, at block 818, processing logic causes the diaphragm to actuate further based on the displacement data (e.g., received at block 816). In some embodiments, the diaphragm is caused to actuate to a target position. A difference between the target position and the current displacement of the diaphragm (e.g., indicated in the displacement data) may be determined and the diaphragm caused to actuate to eliminate the difference.

In some embodiments, the diaphragm is caused to actuate based on one or more outputs from a trained machine learning model. The trained machine learning model may be trained to output an optimized control scheme using historical actuation data for controlling the valve. In some embodiments, a machine learning model is trained with historical actuation data associated with actuation of the diaphragm and historical flow data associated with the flow of fluid to form the trained machine learning model. In some embodiments, based on historical flow data, the trained machine learning model can predict actuation value(s) (e.g., positions of the diaphragm) to actuate the diaphragm to optimize the flow of fluid. In some embodiments, processing logic inputs target flowrate data and/or measured flowrate data into the trained machine learning model. The trained machine learning model may output one or more actuation values associated with a predicted fluid flow rate and/or predicted diaphragm position to optimize the flow of fluid.

Figure 9:
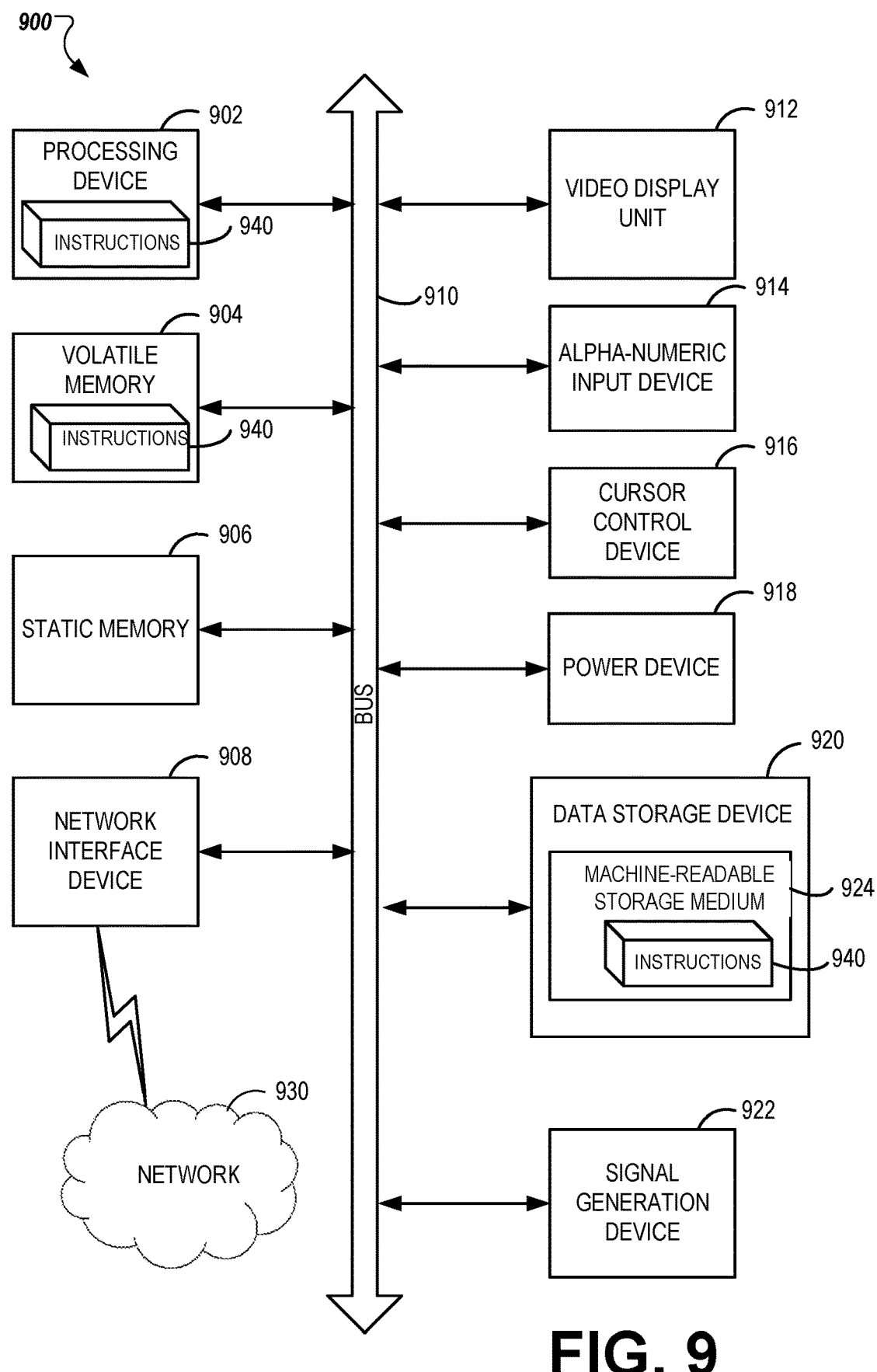
FIG. 9 is a block diagram illustrating a computer system for use in accordance with the embodiments of the present disclosure.

FIG. 9 illustrates a diagrammatic representation of a machine in the exemplary form of a computer system 900 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a PDA, a cellular telephone, a web appliance, a server, a network router, switch or bridge, or any machine capable of executing a set of instructions (sequentially or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 900 may be utilized by or illustrative of any of the electronic components described herein.

The exemplary computer system 900 includes a processing device (processor) 902, a main memory 904 (e.g., ROM, flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 920, which communicate with each other via a bus 910.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 940 for performing the operations discussed herein.

The computer system 900 may further include a network interface device 908. The computer system 900 also may include a video display unit 912 (e.g., a liquid crystal display (LCD), a cathode ray tube (CRT), or a touch screen), an alphanumeric input device 914 (e.g., a keyboard), a cursor control device 916 (e.g., a mouse), and a signal generation device 922 (e.g., a speaker).

Power device 918 may monitor a power level of a battery used to power the computer system 900 or one or more of its components. The power device 918 may provide one or more interfaces to provide an indication of a power level, a time window remaining prior to shutdown of computer system 900 or one or more of its components, a power consumption rate, an indicator of whether computer system is utilizing an external power source or battery power, and other power related information. In some implementations, indications related to the power device 918 may be accessible remotely (e.g., accessible to a remote back-up management module via a network connection). In some implementations, a battery utilized by the power device 918 may be an uninterruptable power supply (UPS) local to or remote from computer system 900. In such implementations, the power device 918 may provide information about a power level of the UPS.

The data storage device 920 may include a computer-readable storage medium 924 (e.g., a non-transitory computer-readable storage medium) on which is stored one or more sets of instructions 940 (e.g., software) embodying any one or more of the methodologies or functions described herein. These instructions 940 may also reside, completely or at least partially, within the main memory 904 and/or within the processor 902 during execution thereof by the computer system 900, the main memory 904, and the processor 902 also constituting computer-readable storage media. The instructions 940 may further be transmitted or received over a network 930 via the network interface device 908. While the computer-readable storage medium 924 is shown in an exemplary implementation to be a single medium, it is to be understood that the computer-readable storage medium 924 may include a single medium or multiple media (e.g., a centralized or distributed database, and/or associated caches and servers) that store the one or more sets of instructions 940.

In the foregoing description, numerous details are set forth. It will be apparent, however, to one of ordinary skill in the art having the benefit of this disclosure, that the present disclosure may be practiced without these specific details. While specific embodiments have been described herein, it should be understood that they have been presented by way of example only, and not limitation. The breadth and scope of the present application should not be limited by any of the embodiments described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

References were made to the accompanying drawings, which form a part of the description and in which are shown, by way of illustration, specific embodiments. Although these disclosed embodiments are described in sufficient detail to enable one skilled in the art to practice the embodiments, it is to be understood that these examples are not limiting, such that other embodiments may be used and changes may be made to the disclosed embodiments without departing from their spirit and scope. For example, the blocks of the methods shown and described herein are not necessarily performed in the order indicated in some other embodiments. Additionally, in some other embodiments, the disclosed methods may include more or fewer blocks than are described. As another example, some blocks described herein as separate blocks may be combined in some other embodiments. Conversely, what may be described herein as a single block may be implemented in multiple blocks in some other embodiments. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion. When the term "about" or "approximately" is used herein, this is intended to mean that the nominal value presented is precise within ±10%.

In addition, the articles "a" and "an" as used herein and in the appended claims should generally be construed to mean "one or more" unless specified otherwise or clear from context to be directed to a singular form. Reference throughout this specification to "an embodiment," "one embodiment," "some embodiments," or "certain embodiments" indicates that a particular feature, structure, or characteristic described in connection with the embodiment is included in at least one embodiment. Thus, the appearances of the phrase "an embodiment," "one embodiment," "some embodiments," or "certain embodiments" in various locations throughout this specification are not necessarily all referring to the same embodiment.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of operations leading to a result. The operations are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "processing," "reprocessing," "adding," "subtracting," "multiplying," "dividing," "optimizing," "calibrating," "detecting," "performing," "analyzing," "determining," "enabling," "identifying," "modifying," "transforming," "applying," "causing," "storing," "comparing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A fluid flow valve, comprising:
a housing configured to receive a flow of fluid;
a diaphragm configured to actuate between a closed position and a plurality of open positions;
a first valve portion configured to flow a first amount of fluid responsive to the diaphragm actuating to one or more first open positions of the plurality of open positions; and
multiple second valve portions radially surrounding the first valve portion and configured to flow a second amount of fluid in parallel with the first valve portion responsive to the diaphragm actuating to one or more second open positions of the plurality of open positions.

2. The fluid flow valve of claim 1, wherein the first valve portion comprises one or more first poppets coupled to the diaphragm and the multiple second valve portions comprise multiple second poppets coupled to the diaphragm.

3. The fluid flow valve of claim 2, wherein responsive to the diaphragm actuating to one of the one or more first open positions the one or more first poppets open to allow fluid to flow through the first valve portion and the multiple second poppets remain closed.

4. The fluid flow valve of claim 1, further comprising a strain gauge bonded to the diaphragm and configured to measure displacement of the diaphragm.

5. The fluid flow valve of claim 1, further comprising an actuator configured to actuate the diaphragm based on an input signal.

6. The fluid flow valve of claim 5, wherein the actuator is selected from a group consisting of an electric solenoid actuator, a voice coil actuator, a ferrofluidic actuator, and a piezoelectric actuator.

7. The fluid flow valve of claim 5, further comprising a transfer mechanism configured to convert first motion of the actuator in a first direction to second motion of the diaphragm in an opposite second direction.

8. The fluid flow valve of claim 1, wherein the multiple second valve portions comprise a radial portion substantially surrounding the first valve portion within the housing.

9. The fluid flow valve of claim 1, wherein the first amount of fluid is less than the second amount of fluid.

10. A fluid flow system, comprising:
a valve comprising:
a housing configured to receive a flow of fluid;
a diaphragm configured to actuate between a closed position and a plurality of open positions;
a first valve portion;
multiple second valve portions radially surrounding the first valve portion; and
a processing device configured to:
cause the first valve portion to flow a first amount of fluid by causing the diaphragm to actuate to one or more first open positions of the plurality of open positions; and
cause the multiple second valve portions to flow a second amount of fluid in parallel with the first valve portion by causing the diaphragm to actuate to one or more second open positions of the plurality of open positions.

11. The fluid flow system of claim 10, wherein the first valve portion comprises one or more first poppets coupled to the diaphragm and the multiple second valve portions comprise multiple second poppets coupled to the diaphragm.

12. The fluid flow system of claim 11, wherein responsive to the processing device causing the diaphragm to actuate to one of the one or more first open positions the one or more first poppets open to allow fluid to flow through the first valve portion and the multiple second poppets remain closed.

13. The fluid flow system of claim 10, further comprising:
a strain gauge bonded to the diaphragm and configured to measure displacement of the diaphragm.

14. The fluid flow system of claim 13, wherein the processing device is further configured to receive displacement data from the strain gauge, wherein the processing device causes the diaphragm to actuate based at least in part on the displacement data.

15. The fluid flow system of claim 10, wherein the processing device is further configured to receive flow data associated with flow of fluid from one or more flow sensors, wherein the processing device causes the diaphragm to actuate based at least in part on the flow data and a target fluid flow rate.

16. The fluid flow system of claim 10, further comprising an actuator configured to actuate the diaphragm based on an input signal from the processing device.

17. The fluid flow system of claim 16, further comprising a transfer mechanism configured to convert first motion of the actuator in a first direction to second motion of the diaphragm in an opposite second direction.

18. The fluid flow system of claim 10, wherein the first amount of fluid is less than the second amount of fluid.

19. A method, comprising:
receiving target flow data associated with a flow of fluid through a valve having a first valve portion and multiple second valve portions radially surrounding the first valve portion;
causing a diaphragm to actuate to one or more first open positions to flow a first amount of fluid through the first valve portion based at least in part on the target flow data; and
causing the diaphragm to actuate to one or more second open positions to flow a greater second amount of fluid through at least the multiple second valve portions in parallel with the first valve portion based at least in part on the target flow data.

20. The method of claim 19, further comprising:
receiving displacement data from a strain gauge bonded to the diaphragm; and
causing the diaphragm to actuate further based on the displacement data.

* * * * *